(12) United States Patent
Tominaga et al.

(10) Patent No.: US 9,950,644 B2
(45) Date of Patent: Apr. 24, 2018

(54) VEHICLE SEAT CONTROL APPARATUS

(71) Applicant: Fuji Jukogyo Kabushiki Kaisha, Tokyo (JP)

(72) Inventors: Atsuhiro Tominaga, Tokyo (JP); Gosuke Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/371,081

(22) Filed: Dec. 6, 2016

(65) Prior Publication Data

US 2017/0217335 A1 Aug. 3, 2017

(30) Foreign Application Priority Data

Feb. 2, 2016 (JP) .................. 2016-017644

(51) Int. Cl.
*G06F 17/00* (2006.01)
*B60N 2/02* (2006.01)
(52) U.S. Cl.
CPC ......... *B60N 2/0224* (2013.01); *B60N 2/0228* (2013.01); *B60N 2002/0272* (2013.01)
(58) Field of Classification Search
CPC .......................... B60N 2/0224; B60N 2/0228
(Continued)

(56) References Cited

U.S. PATENT DOCUMENTS

2012/0105637 A1* 5/2012 Yousefi .................. H04N 7/183
348/148

2014/0316660 A1* 10/2014 Le ........................ B60N 2/0244
701/49
(Continued)

FOREIGN PATENT DOCUMENTS

JP    UM S58-45139 A    3/1983
JP    H 05-262173 A    10/1993
(Continued)

OTHER PUBLICATIONS

"Volvo Cars unveils Concept 26, delivering the luxury of time". Volvo Car USA, Press Release, ID: 169396, Nov. 18, 2015 and its English translation thereof, http://www.volvocars.com/jp/about/ourcompany/pressrelease/2015/20151119.
(Continued)

*Primary Examiner* — Muhammad Shafi
(74) *Attorney, Agent, or Firm* — McGinn IP Law Group, PLLC.

(57) ABSTRACT

A vehicle seat control apparatus is configured to be provided in a vehicle switchable between a manual driving state in which a driver performs a driving operation of the vehicle and an automatic driving state in which the driving operation is performed automatically. The apparatus includes a seat adjuster, a controller, and a storage. The seat adjuster adjusts a position of a seat of the vehicle. The controller drives the seat adjuster and makes a transition between the driving two states. The storage stores seat position information indicating the seat position in the the manual driving state. The controller drives the seat adjuster on a basis of the seat position information read out from the storage, and moves, by the seat adjuster, the seat rearward on a basis of the seat position in the manual driving state as a reference position, upon making a transition from the manual driving state to the automatic driving state.

13 Claims, 7 Drawing Sheets

(58) Field of Classification Search
USPC .......................................................... 701/49
See application file for complete search history.

(56) References Cited

U.S. PATENT DOCUMENTS

2015/0321590 A1* 11/2015 Mizoi ...................... B60N 2/62
297/284.1
2016/0159251 A1*  6/2016 Ebina ................... B60N 2/0244
701/49
2016/0347207 A1* 12/2016 Kusunose ............ B60N 2/0248

FOREIGN PATENT DOCUMENTS

| JP | 2015-178332 A | 10/2015 |
| JP | 2016-168972 A | 9/2016 |
| WO | WO 2015/011866 A1 | 1/2015 |

OTHER PUBLICATIONS

Japanese Office Action issued in Japanese Application No. 2016-017644 dated Jun. 13, 2017 with an English translation thereof.

\* cited by examiner

VEHICLE SEAT CONTROL APPARATUS

CROSS-REFERENCE TO RELATED APPLICATIONS

The present application claims priority from Japanese Patent Application No. 2016-017644 filed on Feb. 2, 2016, the entire contents of which are hereby incorporated by reference.

BACKGROUND

The technology relates to a vehicle seat control apparatus. In particular, the technology relates to a vehicle seat control apparatus that moves a seat automatically when making a transition from a manual driving state to an automatic driving state.

In general, a driver adjusts a position and a reclining angle of a seat in accordance with his/her build before starting to drive, especially when a vehicle is shared by multiple people. This is due to the position and an attitude of the seat upon driving the vehicle which vary depending on a factor such as the build of the driver. To save effort of adjusting the position and the reclining angle, a vehicle having a seat memory function has been developed. The seat memory function stores a position and an attitude of a seat corresponding to those of a driving position that is determined by the driver. For example, reference is made to Japanese Unexamined Patent Application Publication (JP-A) No. H05-262173.

JP-A No. 2015-178332 discloses an automatic drive assist apparatus that allows for automatic driving without the aid of a driver's operation. The automatic drive assist apparatus includes a vehicle controlling ECU (Electronic Control Unit) that controls all of an accelerator operation, a brake operation, and a steering operation which serve as operations related to a behavior of a vehicle. The automatic drive assist apparatus controls and drives devices including an engine, a brake, and an electric power steering to perform the automatic driving until the necessity arises on a guide course that the automatic driving is to be halted.

Further, a technique is known that sets a seat to a relax mode upon the automatic driving for the purpose of, for example, reducing driver's fatigue. Reference is made to the Internet website "http://www.volvocars.com/jp/about/ourcompany/pressrelease/2015/20151119" searched on Jan. 5, 2016. Specifically, the seat is moved rearward and a seat back is reclined when the vehicle is placed in an automatic driving state. This configuration allows the driver to be kept away from a steering wheel, making it possible to reduce the driver's fatigue while preventing an operation including a steering operation performed by the automatic driving from being interrupted by the driver.

SUMMARY

Applying the seat memory function to a vehicle having an automatic driving function involves difficulties in setting a seat to a relax position, while keeping a state that allows the seat to be returned promptly to a position corresponding a driving state in the event of an emergency.

It is desirable to provide a vehicle seat control apparatus that optimizes a relax position upon automatic driving for each driver while keeping a state that allows a seat to be returned promptly to a position corresponding a driving state in the event of an emergency.

An aspect of the technology provides a vehicle seat control apparatus that is configured to be provided in a vehicle. The vehicle is switchable between a manual driving state in which a driver performs a driving operation of the vehicle and an automatic driving state in which the driving operation is performed automatically. The vehicle seat control apparatus includes: a seat adjuster that adjusts a position of a seat provided in the vehicle; a controller that drives the seat adjuster and makes a transition in driving state of the vehicle between the manual driving state and the automatic driving state; and a storage that stores seat position information, in which the seat information indicates the position of the seat which is at time of the manual driving state. The controller that drives the seat adjuster on a basis of the seat position information read out from the storage, and moves, by the seat adjuster, the seat rearward on a basis of the position of the seat at the time of the manual driving state as a reference position, upon making a transition in driving state of the vehicle from the manual driving state to the automatic driving state.

The seat adjuster may further adjust the attitude of the seat. The storage may store seat attitude information, the seat information indicating the attitude of the seat which is at time of the manual driving state. The controller may drive the seat adjuster on a basis of the seat attitude information read out from the storage, and adjust, by the seat adjuster, the attitude of the seat on a basis of the attitude of the seat at the time of the manual driving state as a reference attitude, upon making a transition in driving state of the vehicle from the manual driving state to the automatic driving state.

The seat may include a seat back and a seat cushion. The controller may cause the seat adjuster to incline the seat cushion from the reference attitude such that an inclination angle of the seat cushion to a horizontal direction increases and incline the seat back such that an inclination angle of the seat back to the horizontal direction decreases, upon making the transition from the manual driving state to the automatic driving state. The controller causes the seat adjuster to incline the seat cushion to return to the reference attitude and incline the seat back to return to the reference attitude, upon making a transition from the automatic driving state to the manual driving state.

The controller may drive the adjuster to return the position of the seat to the reference position, upon making a transition in the driving state of the vehicle from the automatic driving state to the manual driving state.

BRIEF DESCRIPTION OF THE DRAWINGS

FIGS. 2A and 2B illustrate the vehicle seat control apparatus according to an implementation of the technology, in which FIG. 2A is a side view of a seat at a driving position, and FIG. 2B is a side view of the seat at a relax position.

FIGS. 7A and 7B illustrate a vehicle seat control apparatus according to a reference example, in which FIG. 7A is a side view of a seat, and FIG. 7B is a block diagram illustrating a configuration of a controller.

DETAILED DESCRIPTION

In the following, a vehicle seat control apparatus according to one implementation of the technology is described in detail with reference to the accompanying drawings.

Figure 7A:
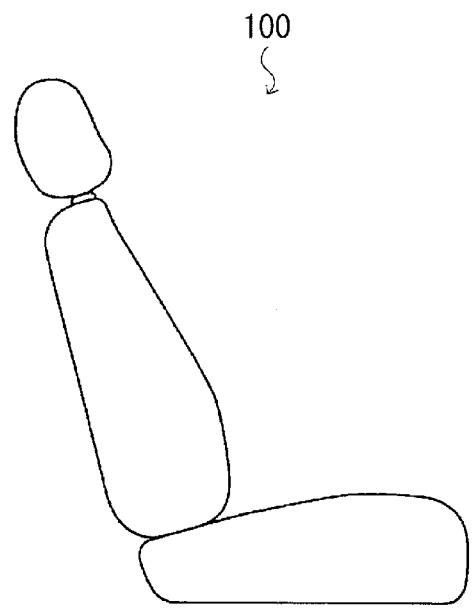
Figure 7B:
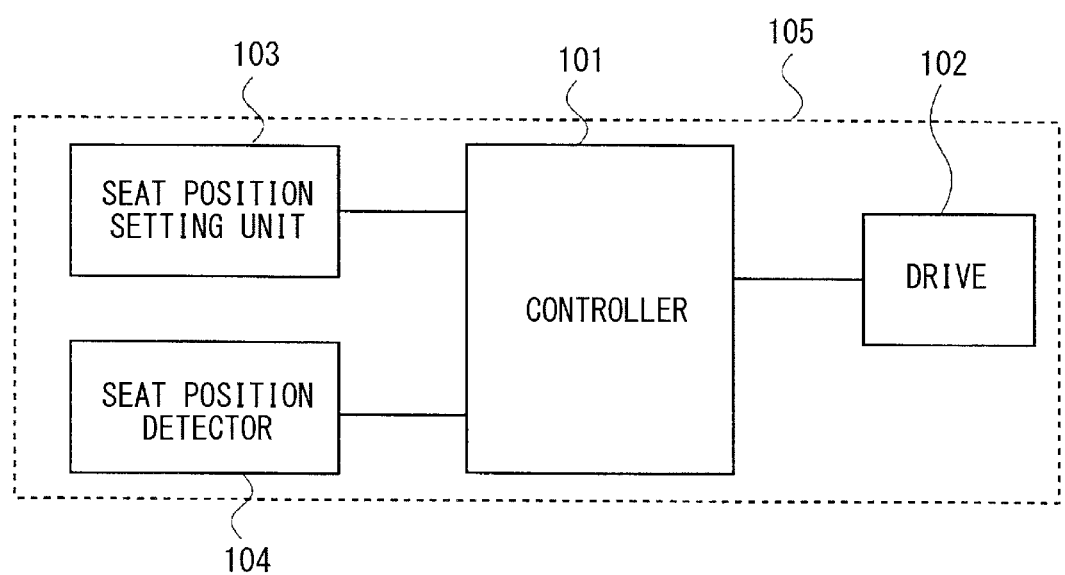

Before describing an implementation of the technology, a description is given, with reference to FIG. 7A and FIG. 7B, of a vehicle having a seat memory function according to a reference example. FIG. 7A is a side view of a seat 100, and FIG. 7B is a block diagram illustrating a seat controller 105.

Referring to FIG. 7B, the seat controller 105 includes a controller 101, a seat position setting unit 103, a seat position detector 104, and a drive 102. The controller 101 performs various calculations that control a position and an attitude of the seat 100 illustrated in FIG. 7A. The seat position setting unit 103 may be switches operated by a driver to adjust the position and the attitude of the seat 100. The seat position detector 104 detects the position and the attitude of the seat 100. The drive 102 varies the position and the attitude of the seat 100.

The seat controller 105 may operate as follows. Here, a position and an angle of the seat 100 suitable for each driver have been detected by the seat position detector 104 and have been stored in an unillustrated storage provided in the controller 101. When the driver sits on the seat 100 and performs an operation of optimizing the position and the attitude of the seat 100 on the seat position setting unit 103, the controller 101 reads out data on the position and the angle of the seat 100 relevant to the driver. The controller 101 thereafter drives the drive 102 to set the position and the angle of the seat 100 to a predetermined position and a predetermined angle. With this configuration, it is possible to adjust the position and the angle of the seat 100 substantially automatically, and save the driver the effort upon adjusting the seat 100 accordingly.

However, applying the seat memory function to a vehicle having an automatic driving function involves difficulties in setting a seat to a relax position, while keeping a state that allows the seat to be returned promptly to a position corresponding a driving state in the event of an emergency.

Specifically, as a way to set the seat to the relax position, one example method may be to decide in advance a position to which the seat is to be moved rearward. The method, however, involves difficulties in that factors such as height and limb length vary depending on a driver. For example, employing the fixed seat position for the relax position may cause an amount of rearward movement of the seat to be insufficient in a case where the driver's limb length is long. In this case, a leg or any other part of the body of the driver may possibly come into contact with a member such as an accelerator pedal unintentionally upon the automatic driving. Employing the fixed seat position for the relax position may also cause the amount of rearward movement of the seat to be excessive in a case where the driver's limb length is short. In this case, it may possibly take a long time to return the seat to its original position for manual driving in the event of an emergency, leaving room for improvement in terms of ensuring enough safety.

Figure 1:
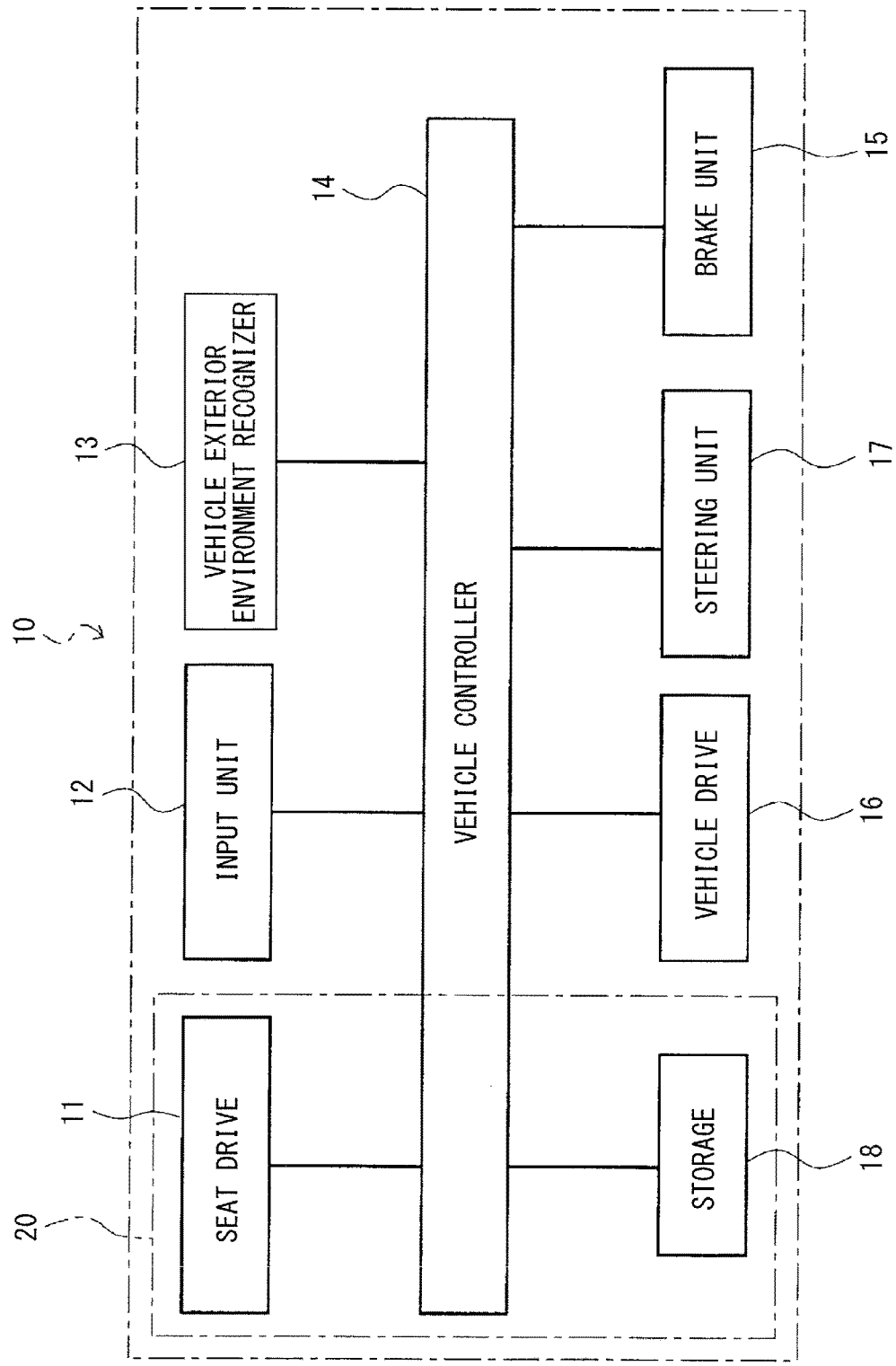
FIG. 1 is a block diagram illustrating an outline of a vehicle seat control apparatus according to an implementation of the technology.

FIG. 1 is a block diagram illustrating an outline of a seat controller 20 according to an implementation of the technology. In one implementation, the seat controller 20 may serve as a "vehicle seat control apparatus". The seat controller 20 may be mounted on a vehicle 10, and serve as a part of a control mechanism that controls the vehicle 10. The seat controller 20 has a function of automatically controlling a position or both the position and an attitude of a seat 30, upon making a transition from a manual driving state to an automatic driving state and upon making a transition from the automatic driving state to the manual driving state.

The vehicle 10 may include various devices that achieve the automatic driving. Specifically, the vehicle 10 may include a vehicle controller 14, an input unit 12, a vehicle exterior environment recognizer 13, a vehicle drive 16, a steering unit 17, and a brake unit 15.

The vehicle controller 14 may serve as a controller that controls the vehicle 10. For example, the vehicle controller 14 may be an electronic control unit (ECU) that includes a device such as a calculator that performs various calculations and operations. Alternatively, the vehicle controller 14 may be any other device having a control function. On the basis of information such as pieces of input information received from the input unit 12 and the vehicle exterior environment recognizer 13, the vehicle controller 14 may control the vehicle drive 16, the steering unit 17, and the brake unit 15 to thereby perform the automatic driving of the vehicle 10. Further, on the basis of information on the position or both the position and the attitude of the seat 30 stored in a storage 18, the vehicle controller 14 drives a seat drive 11 to thereby set the seat 30 to a relax position upon the automatic driving, as described later in detail.

The brake unit 15 may perform deceleration and stopping of the vehicle 10. For example, the brake unit 15 may be a brake, or any other suitable device, which operates on the basis of a signal supplied from the vehicle controller 14.

The seat drive 11 may include a device such as a motor provided at the seat 30 on which a driver 34 sits or provided around the seat 30 (see FIG. 2). On the basis of instructions outputted from the vehicle controller 14, the seat drive 11 may perform operations such as moving the seat 30 forward and rearward, varying an angle of a seat back 32, and moving a seat cushion 31 up and down.

The storage 18 may include a memory device such as a random access memory (RAM) and a read-only memory (ROM). The storage 18 may store, as seat information, the information that indicates the position or both the position and the attitude of the seat 30 in manual driving. For example, the position and the attitude of the seat 30 may include a position in a front-rear direction of the seat 30, the angle of the seat back 32, a position in an up-down direction of the seat cushion 31, an inclination angle of the seat cushion 31, a position in an up-down direction of a headrest 33, and an angle of the headrest 33. One implementation may include a so-called seat memory mechanism that automatically adjusts, on the basis of the seat information stored in the storage 18, the position and the attitude of the seat 30 suitable for the driver 34 when the driver 34 has seated on the seat 30 and performed a predetermined input operation.

The input unit 12 may include a device operable by an occupant and the driver 34, such as a touch panel and switches including push buttons. The vehicle exterior environment recognizer 13 may include a device that recognizes an environment outside the vehicle 10, such as a stereo camera and a radar device. The vehicle drive 16 may include a power source that causes the vehicle 10 to travel, such as an engine and a motor. The steering unit 17 may include a device that steers the vehicle 10, such as a steering. The vehicle 10 may also be provided with an unillustrated notifying device such as a multifunctional display.

The vehicle controller 14 may switch between the manual driving state and the automatic driving state, on the basis of the instructions outputted from the input unit 12. The manual driving state is a normal driving state in which the driver 34 performs a driving operation. The automatic driving state is a driving state in which the vehicle controller 14 performs the automatic driving.

In the automatic driving state, the vehicle controller 14 may execute various calculations on the basis of pieces of information supplied from the devices including the vehicle exterior environment recognizer 13. By executing the various calculations, the vehicle controller 14 may constantly monitor factors including a current state of traveling and the environment outside the vehicle 10. The vehicle controller 14 may further controls the devices including the brake unit 15, the vehicle drive 16, and the steering unit 17 to perform the appropriate automatic driving in accordance with a current situation. The vehicle controller 14 may thus have the automatic driving function and may be able to perform the automatic driving operation of the vehicle 10. Further, when the vehicle 10 is in the automatic driving state, the vehicle controller 14 may cause the seat drive 11 to vary the position and the attitude of the seat 30 to thereby set the seat 30 to the relax position. The term "relax position" as used herein according to one implementation refers to the position and the attitude, in the automatic driving state, of the seat 30 in which the seat 30 is moved rearward and the seat back 32 is reclined to allow the driver 34 to relax and prevent the automatic driving from being interrupted by the driver 34.

The vehicle controller 14 may cause, on the basis of the input information received from the input unit 12 or the vehicle exterior environment recognizer 13, the driving state of the vehicle 10 to make a transition from the automatic driving state to the manual driving state. Further, upon the transition, the vehicle controller 14 may perform operations such as moving the seat 30 forward and raising the seat back 32 to thereby set the seat 30 to a driving position that allows the driver 34 to operate the devices including the steering unit 17 and the brake unit 15. The term "driving position" as used herein according to one implementation refers to the position and the attitude of the seat 30 which are set by the driver 34 in the manual driving state so that the driver 34 is able to operate a steering wheel 25 and the brake pedal easily.

Figure 2A:
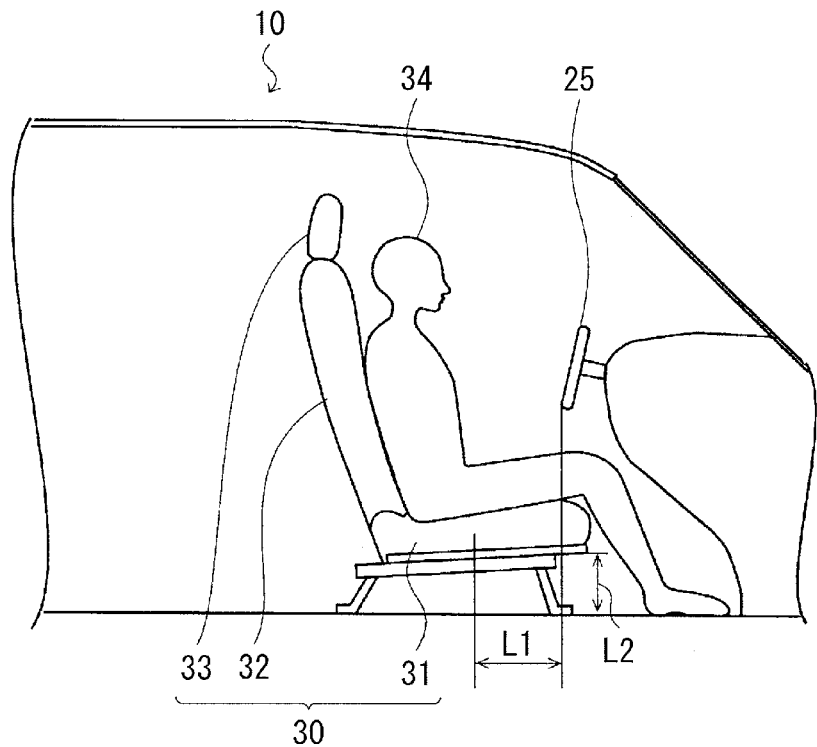
Figure 2B:
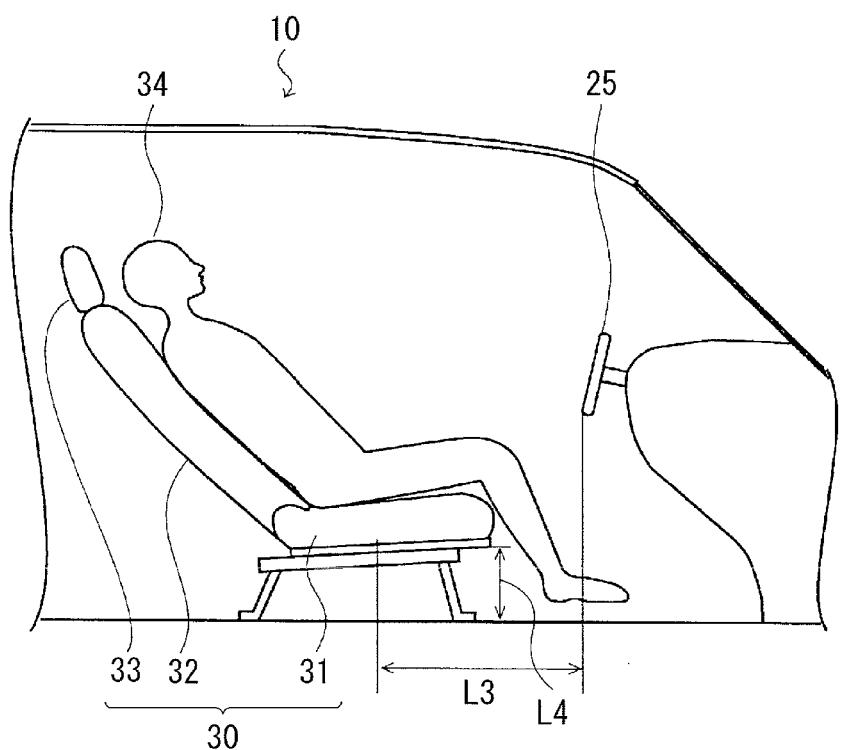

A description is now given, with reference to FIGS. 2A and 2B, of the position and the attitude of the seat 30 according to an implementation. FIG. 2A is a side view and illustrates the position and the attitude of the seat 30 at the driving position. FIG. 2B is a side view and illustrates the position and the attitude of the seat 30 at the relax position.

Referring to FIG. 2A, the position and the attitude of the seat 30 may be set to the driving position suitable for the manual driving, in the manual driving state in which the driver 34 drives the vehicle 10. Specifically, the position in the front-rear direction of the seat 30, the angle of the seat back 32, a height of the seat cushion 31, the position in the up-down direction of the headrest 33, and the angle of the headrest 33 may be set to those that are suitable for the manual driving. In one implementation, the position in the front-rear direction of the seat 30 may be defined as a position in a distance L1 from the center of the seat cushion 31 to the steering wheel 25. In one implementation, the height of the seat cushion 31 may be a distance L2 from a lower end of the seat cushion 31 to the floor of the vehicle 10.

Referring to FIG. 2B, the position and the attitude of the seat 30 may be set to the relax position suitable for relaxation of driver's fatigue, in the automatic driving state in which the vehicle controller 14 drives the vehicle 10. Specifically, at the time of the relax position, the seat 30 may be moved more rearward than the driving position. In other words, a distance L3 from the center of the seat cushion 31 to the steering wheel 25 may be made longer than the distance L1 illustrated in FIG. 2A. This configuration moves the driver 34 rearward, allowing the driver 34 to stretch his/her legs forward and reducing the fatigue resulting from boarding the vehicle 10 accordingly. This configuration also allows the driver 34 to be kept away from members such as the steering wheel 25 and the unillustrated brake pedal, making it possible to avoid a situation in which the driver 34 comes into contact with the member such as the steering wheel 25 unintentionally in the automatic driving state.

Further, at the time of the relax position, the seat back 32 may be reclined as compared with the driving position. This configuration allows the driver 34 to recline his/her upper body and reduces the fatigue resulting from boarding the vehicle 10 accordingly. The seat 30 may also be moved upward at the time of the relax position. In other words, a distance L4 at the time of the relax position from the seat cushion 31 to the floor of the vehicle 10 may be made longer than the distance L2 at the time of the driving position. This configuration raises a level of the head of the driver 34, making it possible to provide the driver 34 with a favorable field of view in the automatic driving state.

Figure 3:
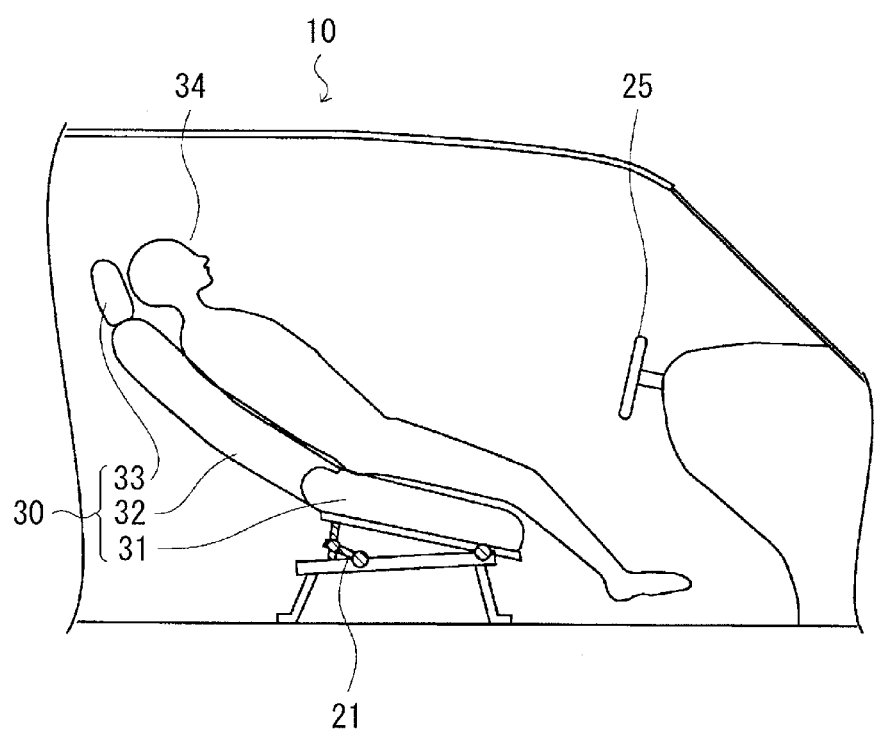
FIG. 3 illustrates the vehicle seat control apparatus according to an implementation of the technology, and is a side view of the seat at another relax position.

FIG. 3 illustrates an example of another relax position in which the seat 30 as a whole is moved rearward and the seat cushion 31 is inclined. Specifically, by means of an operation of a link mechanism 21 provided at a lower part of the seat cushion 31, a rear part of the seat cushion 31 may be lifted with a forward part of the seat cushion 31 serving as a point of support. This configuration allows the seat cushion 31 and the seat back 32 to form a surface that is nearly flat and nearly continuous as compared with the relax position illustrated in FIG. 2B, making it possible for the driver 34 to lie on the seat 30 in a more relaxed fashion and making it possible to further reduce the fatigue of the driver 34 accordingly.

Figure 4:
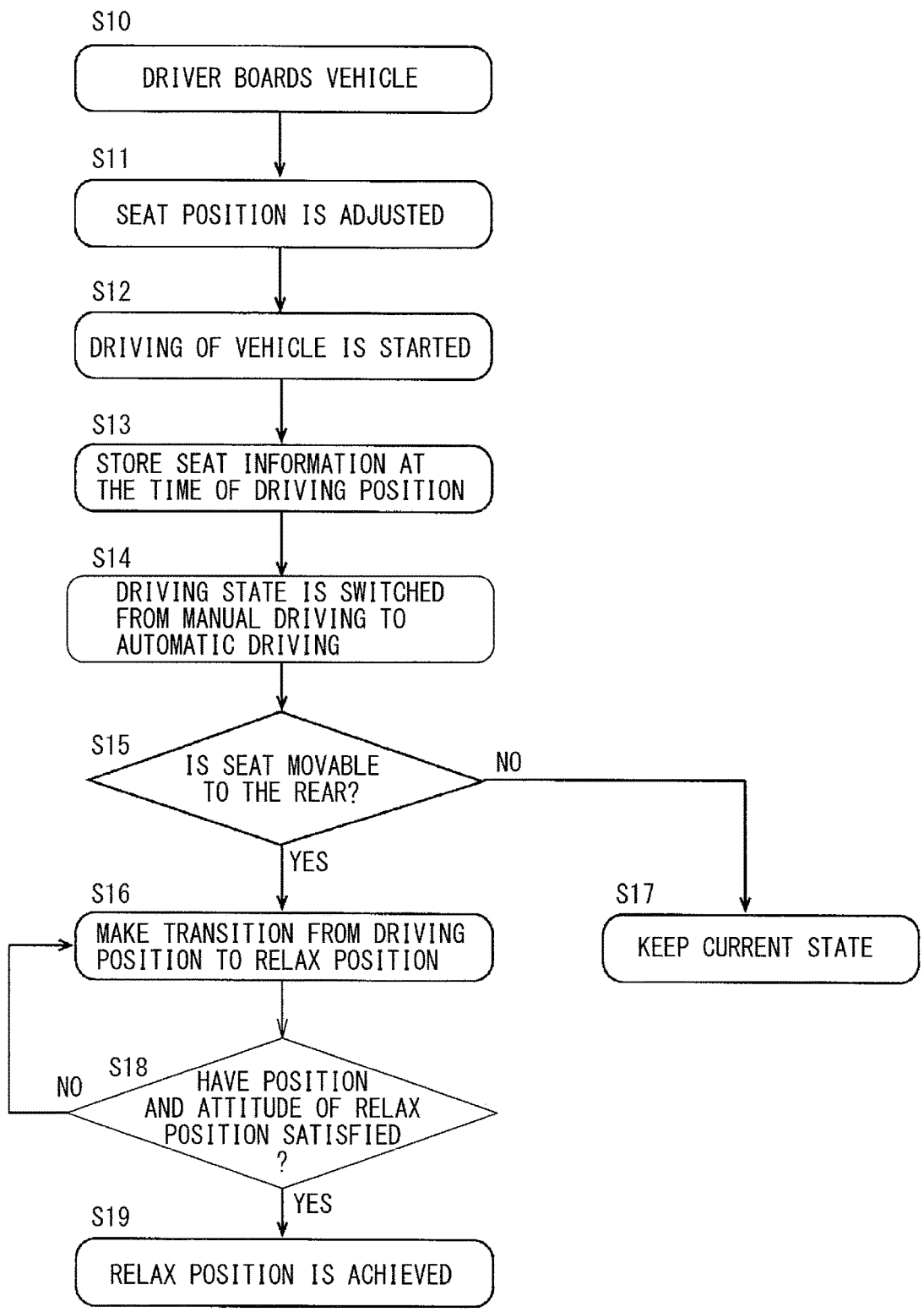
FIG. 4 illustrates the vehicle seat control apparatus according to an implementation of the technology, and is a flowchart illustrating an example of an operation of causing a seat to make a transition from the driving position to the relax position.

A description is now given, on the basis of a flowchart illustrated in FIG. 4 and with reference to FIGS. 1 to 3, of an operation of causing the seat 30 to make a transition from the driving position to the relax position upon making the transition from the manual driving state to the automatic driving state.

In step S10, the driver 34 may board the vehicle 10 and sit on the seat 30. Here, the position and the attitude of the seat 30 may have been set to those suitable for any other driver when the vehicle 10 is shared by multiple people. In this case, in step S11, the driver 34 on the vehicle 10 may adjust the position and the attitude of the seat 30. Specifically, referring to FIGS. 2A and 2B, the driver 34 may adjust factors such as the position in the front-rear direction of the seat 30, the inclination angle of the seat back 32, and the position in the up-down direction of the seat cushion 31 to determine the driving position. The adjustment of the position and the attitude of the seat 30 may be performed by operating the input unit 12 such as switches provided at or around the seat 30 and thus driving the seat drive 11. Alternatively, the driving position may be determined automatically by means of the seat memory function described above.

Thereafter, in step S12, the manual driving operation of the vehicle 10 may be performed by driving the vehicle drive 16 that may include the power source such as the engine and the motor. In other words, the driver 34 may operate the members such as the steering wheel 25, the unillustrated brake pedal, and the accelerator pedal to drive the vehicle 10 manually in the initial stage of the driving of the vehicle 10.

Thereafter, in step S13, storing, in the storage 18, of the seat information at the time of the driving position may be performed. Specifically, referring to FIGS. 2A and 2B, the factors such as the position in the front-rear direction of the seat 30, the inclination angle of the seat back 32, and the position in the up-down direction of the seat cushion 31 may be stored as the driving position in the storage 18.

Considering the fact that the driver 34 adjusts the position of the seat 30 before traveling of the vehicle 10, the position and the attitude of the seat 30 upon starting of the traveling of the vehicle 10 may be adopted as those at the time of the driving position. Alternatively, the position and the attitude of the seat 30 at the time when the vehicle 10 has reached a predetermined traveling speed may be adopted as those at the time of the driving position, considering the fact that the position of the seat 30 may sometimes be adjusted upon low-speed traveling in the initial stage of the driving of the vehicle 10.

Thereafter, in step S14, the driving state may be switched from the manual driving state to the automatic driving state. Specifically, for example, the occupant or the driver 34 may operate the input unit 12 to provide the vehicle controller 14 with instructions indicating that the driving state is to be switched from the manual driving state to the automatic driving state. The vehicle controller 14 may then execute various calculations, and may switch the driving state from the manual driving state to the automatic driving state when determining that a situation of the vehicle 10 satisfies a condition that the automatic driving is possible. The vehicle controller 14 may control the vehicle drive 16, the steering unit 17, and the brake unit 15 to drive the vehicle 10 in the automatic driving state.

Thereafter, in step S15, the vehicle controller 14 may make a determination as to whether the seat 30 is movable to the rear in making the transition from the driving position to the relax position. As described above, the seat 30 as a whole may be moved rearward when making the transition from the driving position to the relax position. However, the rearward movement of the seat 30 may possibly be hindered by an obstacle when the obstacle is present at the rear of the seat 30 that may serve as a driver's seat. To address this, the presence of the obstacle may be confirmed in step S15. Specifically, the presence of the obstacle may be confirmed by means of a detector such as a weight sensor provided in a seat back of a backseat and a camera that monitors a vehicle interior of the vehicle 10. The vehicle controller 14 may make the determination as to whether the seat 30 is movable to the rear on the basis of a result of the confirmation.

When the seat 30 is determined from a result of the determination as being unmovable to the rear due to the presence of the obstacle, i.e., when NO is satisfied in step S15, the vehicle controller 14 may cause the seat 30 to keep the driving position without setting the seat 30 to the relax position in step S17. Here, the vehicle controller 14 may notify the driver 34 of the presence of the obstacle at the rear of the seat 30.

When the seat 30 is movable to the rear, i.e., when YES is satisfied in step S15, the vehicle controller 14 may start an operation of causing the seat 30 to make the transition from the driving position to the relax position in a step after step S15.

Figure 5:
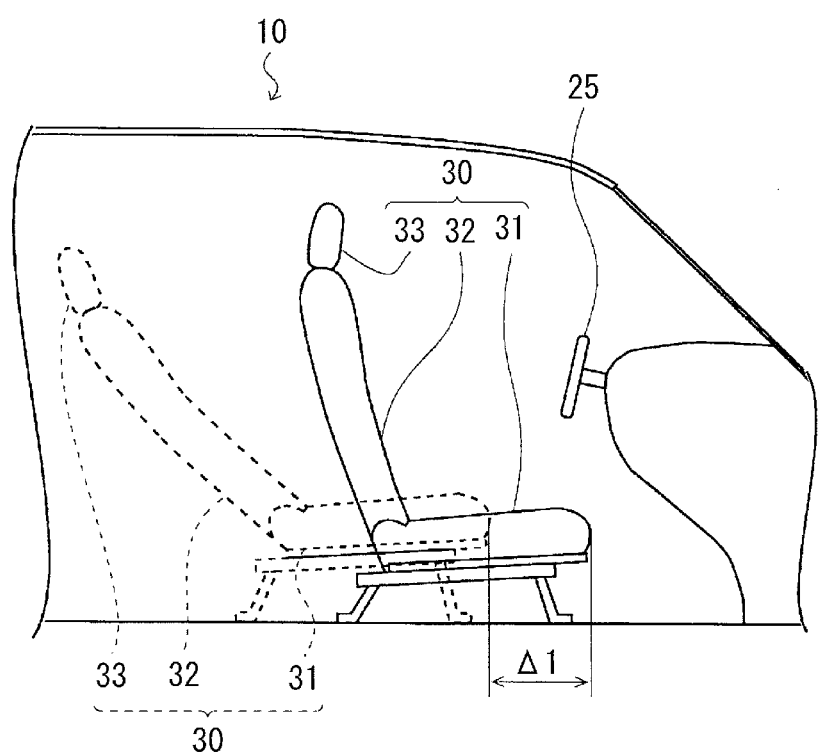
FIG. 5 illustrates the vehicle seat control apparatus according to an implementation of the technology, and is a side view of the seat at the driving position and at the relax position.

In step S16, the operation of making the transition, in position and attitude of the seat 30, from the driving position to the relax position is started, as described with reference to FIG. 5. FIG. 5 illustrates an example in which the seat 30 at the driving position is denoted by a solid line and the seat 30 at the relax position is denoted by a dotted line. Note that the position and the attitude of the seat 30 may be calculated from the number of rotations of the motor that may serve as the seat drive 11, or may be measured by an unillustrated sensor that may be provided separately.

In step S16, a distance in which the seat 30 moves rearward in making the transition, in position and attitude of the seat 30, from the driving position to the relax position is based on a position in the front-rear direction of the seat 30 at the time of the driving position. Specifically, the vehicle controller 14 reads out, from the storage 18, a rearward movement amount Δ1 upon making the transition from the driving position to the relax position. The rearward movement amount Δ1 defines an amount by which the seat 30 is moved rearward. Further, the vehicle controller 14 operates the seat drive 11 to move the seat 30 toward the rear.

The rearward movement amount Δ1 of the seat 30 may be stored in the storage 18 as a predetermined length, or may be calculated by the vehicle controller 14 in accordance with a factor such as body type of the driver 34. The predetermined length may be, for example, about some tens of centimeters. In one implementation where the rearward movement amount Δ1 is calculated in accordance with the body type of the driver 34, body weight of the driver 34 may be calculated by a detector such as a weight sensor provided in the seat 30, for example. This configuration makes it possible to increase the rearward movement amount Δ1 in accordance with the body weight of the driver 34. Hence, the configuration makes it possible to increase the rearward movement amount Δ1 when the body of the driver 34 is large, and thereby ensure space at the front of the seat 30 for the driver 34 to stretch his/her legs. The configuration also makes it possible to decrease the rearward movement amount Δ1 when the body of the driver 34 is small, and thereby prevent the seat 30 from moving to the rear excessively at the time of the relax position.

In step S16, the seat back 32 may also be reclined rearward in addition to the rearward movement of the seat 30. Specifically, the vehicle controller 14 may drive the seat drive 11 to recline the seat back 32 until the angle of the seat back 32 meets a predetermined angle stored in the storage 18. The vehicle controller 14 may also drive, on the basis of the angle of the seat back 32 at the time of the driving position, the seat drive 11 to recline the seat back 32 at a predetermined angle.

Further, in step S16, the seat cushion 31 may be lifted. Specifically, the vehicle controller 14 may drive the seat drive 11 to lift the seat cushion 31 until the seat cushion 31 is lifted to a predetermined height stored in the storage 18. The vehicle controller 14 may also lift the seat cushion 31 on the basis of the height of the seat cushion 31 at the time of the driving position.

In one implementation where the relax position illustrated in FIG. 3 is employed, the link mechanism 21 may be operated in addition to the foregoing operations to incline the seat cushion 31 until the angle of the seat cushion 31 meets a predetermined angle.

The operation of making the transition from the driving position to the relax position may be continued until an amount of movement of the seat 30 meets the predetermined rearward movement amount Δ1, i.e., continued during satisfaction of NO in step S18. When the amount of movement of the seat 30 has met the rearward movement amount Δ1, i.e., when YES is satisfied in step S18, the vehicle controller 14 may stop the seat drive 11. Further, the vehicle controller 14 may stop the seat drive 11 that adjusts the inclination angle of the seat back 32 when the angle of the seat back 32 meets the predetermined inclination angle. The foregoing operations achieve a state in which the seat 30 is set to the relax position in step S19, making it possible to reduce the fatigue of the driver 34 sitting on the seat 30.

In the present implementation, the seat 30 is moved rearward, on the basis of the position of the seat 30 at the time of the driving position. Hence, it is possible to achieve the relax position appropriate for a factor such as the body type and a driving posture of the driver 34. It is also possible to return the seat 30 to the driving position promptly.

Specifically, the position of the seat 30 has been already set at the rear at the time of the driving position in a case of, for example, the driver 34 with relatively large body. Hence, when making the transition from the driving position to the relax position, the seat 30 may be moved rearward on the basis of the position of the seat 30 located relatively at the rear. This makes it possible to ensure, at the front of the seat 30, enough space for the driver 34 to stretch his/her legs.

In a case of, for example, the driver 34 with relatively small body, the position of the seat 30 has been already set at the front at the time of the driving position. Hence, when making the transition from the driving position to the relax position, the seat 30 may be moved rearward on the basis of the position of the seat 30 located relatively at the front. This prevents the seat 30 from moving to the rear excessively, making it possible to allow the seat 30 to reach a predetermined location promptly upon making the transition from the relax position to the driving position in the event of an emergency or any other situation.

Figure 6:
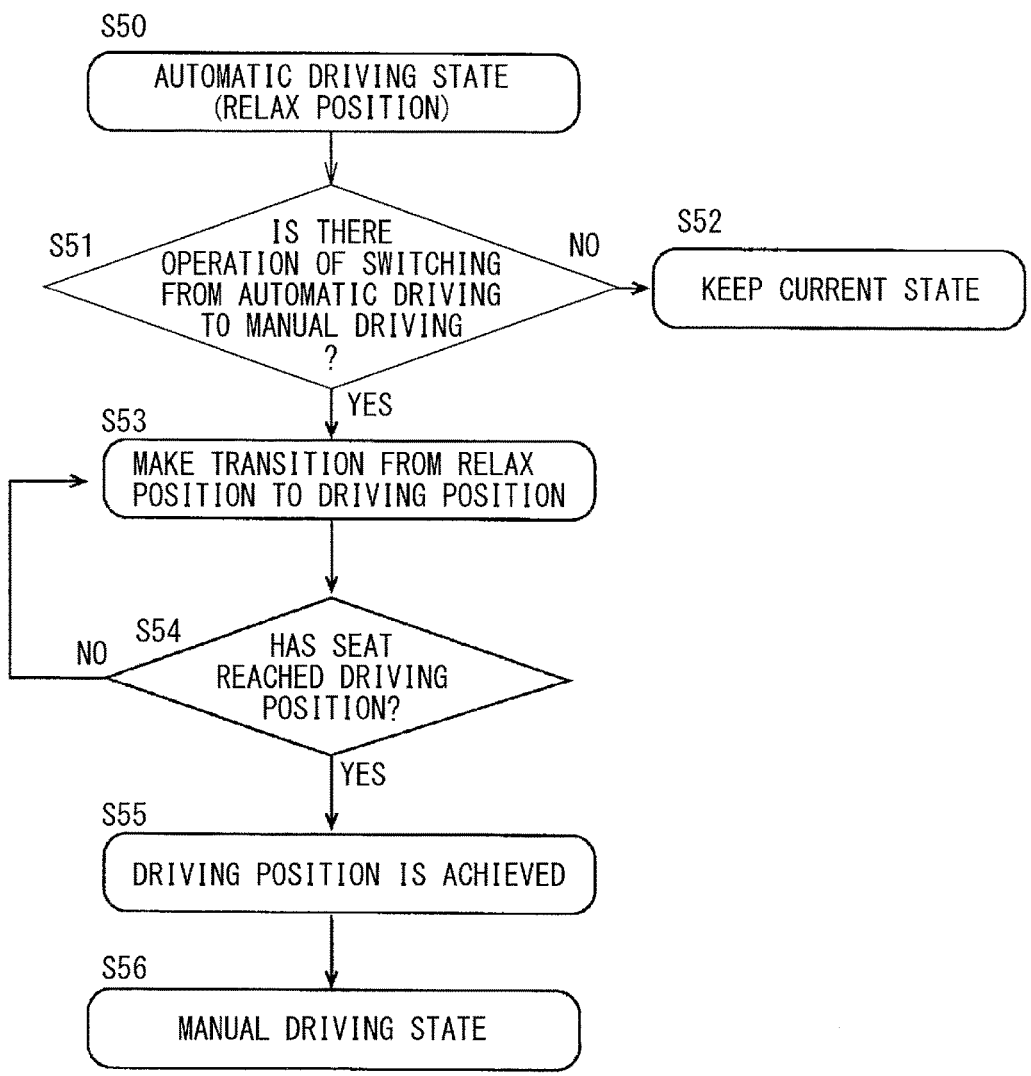
FIG. 6 illustrates the vehicle seat control apparatus according to an implementation of the technology, and is a flowchart illustrating an example of an operation of causing the seat to make a transition from the relax position to the driving position.

A description is now given, on the basis of FIG. 6 and with reference to FIGS. 1 to 3 and 5, of an operation of causing the seat 30 to make the transition from the relax position to the driving position, upon returning to the manual driving state following the transition to the automatic driving state as described above.

In step S50, the vehicle 10 may travel under the automatic driving state and thus the seat 30 may be at the relax position as denoted by the dotted line in FIG. 5.

In step S51, a determination may be made as to whether there is an operation of switching the driving state from the automatic driving state to the manual driving state. The operation of switching the driving state from the automatic driving state to the manual driving state may be based on an operation performed on the input unit 12 by the driver 34, or may be based on calculation processing performed by the vehicle controller 14 on the basis of an input received from the vehicle exterior environment recognizer 13.

When there is no operation of switching the driving state from the automatic driving state to the manual driving state, i.e., when NO is satisfied in step S51, the vehicle controller 14 may continue the automatic driving state and thus the position and the attitude of the seat 30 may be kept to the relax position in step S52.

When there is the operation of switching the driving state from the automatic driving state to the manual driving state, i.e., when YES is satisfied in step S51, the vehicle controller 14 may perform an operation control of making the transition, in position and attitude of the seat 30, from the relax position to the driving position in step S53. Specifically, the vehicle controller 14 may operate the seat drive 11 to move the seat 30 forward and raise the seat back 32. The vehicle controller 14 may operate the seat drive 11 to lower the seat cushion 31 when the seat cushion 31 is lifted at the time of the relax position. Further, when the seat cushion 31 is inclined at the time of the relax position as illustrated in FIG. 3, the vehicle controller 14 may also operate the link mechanism 21 in reverse to what has been described above to lower the rear part of the seat cushion 31, and thereby return the inclination angle of the seat cushion 31 to its original inclination angle at the time of the driving position.

The operation of making the transition from the relax position to the driving position may be continued until the seat 30 reaches its original driving position, i.e., continued during satisfaction of NO in step S54. When the seat 30 has reached its original driving position, i.e., when YES is satisfied in step S54, the vehicle controller 14 may stop the seat drive 11.

Upon making the transition in position and attitude of the seat 30 from the relax position to the driving position, the operation of moving the seat 30 forward and the operation of raising the seat back 32 may be performed together. Alternatively, one of the operation of moving the seat 30 forward and the operation of raising the seat back 32 may be performed on a priority basis, especially in a particular situation such as in the event of an emergency. For example, the operation of moving the seat 30 forward may be performed on the priority basis to allow the lower body of the driver 34 to be moved to the front on a priority basis, making it possible for the driver 34 to press down on the brake pedal and thereby stop the vehicle 10. The operation of raising the seat back 32 may be performed on the priority basis to allow the driver 34 to operate the steering wheel 25, making it possible for the driver 34 to steer the vehicle 10 and thereby avoid a dangerous situation.

In step S55, the position in the front-rear direction of the seat 30, the angle of the seat back 32, the height of the seat cushion 31, and the angle of the seat cushion 31 may have been set to those corresponding to the original driving position, achieving a state in which the steering wheel 25, the brake pedal, and the accelerator pedal are easily operable by the driver 34.

Thereafter, in step S56, the vehicle controller 14 may set the driving state of the vehicle 10 from the automatic driving state to the manual driving state. In other words, the driver 34 may operate the members such as the steering wheel 25, the accelerator pedal, and the brake pedal to drive the vehicle 10 manually.

In the present implementation, the position and the attitude at the time of the relax position are determined on the basis of the position and the attitude of the seat 30 at the time of the driving position, preventing the rearward movement amount Δ1 upon making the transition from the driving position to the relax position from being excessive. Thus, it is possible to cause the seat 30 to make the transition from the relax position to the driving position promptly, upon making the transition from the automatic driving state to the manual driving state in the event of an emergency or any other situation. Hence, it is possible to allow the driver 34 to operate the members such as the steering wheel 25 and the brake pedal immediately, and thereby allow the driver 34 to drive the vehicle 10 safely.

It is possible to achieve at least the following configurations from the above-described example implementations of the technology.

A vehicle seat control apparatus that controls a seat provided in a vehicle, the vehicle being switchable between a manual driving state in which a driver performs a driving operation of the vehicle and an automatic driving state in which the driving operation is performed automatically, the vehicle seat control apparatus including:

a seat drive that adjusts a position and an attitude of the seat;

a storage that stores seat information, the seat information indicating the position and the attitude of the seat which are at time of the manual driving state; and a controller that drives the seat drive on a basis of the seat information read out from the storage, and moves, by the seat drive, the seat rearward on a basis of the position of the seat at the time of the manual driving state as a reference position, upon making a transition in driving state of the vehicle from the manual driving state to the automatic driving state.

According to this configuration, the seat is moved rearward on the basis of the position in the front-rear direction of the seat at the time of the manual driving, in setting the state of the seat from the driving position to the relax position upon the automatic driving. Hence, it is possible to optimize, for each driver, the position in the front-rear direction of the seat which is at the time of the relax position.

The controller may return the position in a front-rear direction of the seat to the reference position, upon making a transition in the driving state of the vehicle from the automatic driving state to the manual driving state.

According to this configuration, the seat may return to the driving position that is the same as the driving position at the time of the previous manual driving upon returning of the driving state to the manual driving state. Hence, it is possible to set the position in the front-rear direction of the seat to a location suitable for the manual driving.

The seat may include a seat back and a seat cushion, the controller may recline the seat back by the seat drive and incline the seat cushion by the seat drive, upon making the transition from the manual driving state to the automatic driving state, and the controller may raise the seat back by the seat drive and return an inclination of the seat cushion to an original inclination by the seat drive, upon making a transition from the automatic driving state to the manual driving state.

According to this configuration, the seat back may be reclined to reduce the driver's fatigue when the driving state of the vehicle is the automatic driving, and the seat back may be raised to allow the driver to take a posture suitable for the driving when the driving state of the vehicle is the manual driving.

The storage may store, as information that indicates the reference position, the seat information that indicates the position and the attitude of the seat which are after starting of the manual driving state.

According to this configuration, the seat may be moved rearward upon the automatic driving on the basis of the seat position that is after the starting of the manual driving state, by taking into consideration the adjustment in the front-rear direction of the seat position which may have been already completed by the driver before the starting of the manual driving of the vehicle. Hence, it is possible to optimize the position of the seat at the time of the relax position.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle seat control apparatus that is configured to be provided in a vehicle, the vehicle being switchable between a manual driving state in which a driver performs a driving operation of the vehicle and an automatic driving state in which the driving operation is performed automatically, the vehicle seat control apparatus comprising:

a seat adjuster that adjusts a position of a seat provided in the vehicle;

a controller that drives the seat adjuster and makes a transition in driving state of the vehicle between the manual driving state and the automatic driving state; and a storage that stores seat position information, the seat position information indicating the position of the seat which is at a time of the manual driving state, wherein the controller drives the seat adjuster on a basis of the seat position information read out from the storage, and moves, by the seat adjuster, the seat rearward on a basis of the position of the seat at the time of the manual driving state as a reference position, upon making a transition in a driving state of the vehicle from the manual driving state to the automatic driving state, wherein, during the transition in the driving state of the vehicle from the manual driving state to the automatic driving state, the seat adjuster moves the seat to increase a distance from a seat cushion of the seat to a floor of the vehicle, and wherein the controller is configured to determine, on a basis of a detection of an obstacle at rearward of the seat, whether the seat is movable rearward or the seat is unmovable rearward, and to cause to move the seat rearward when it is determined that the seat is movable rearward.

2. The vehicle seat control apparatus according to claim 1, wherein the seat adjuster further adjusts an attitude of the seat, wherein the storage stores seat attitude information, the seat information indicating the attitude of the seat which is at the time of the manual driving state, and wherein the controller drives the seat adjuster on a basis of the seat attitude information read out from the storage, and adjust, by the seat adjuster, the attitude of the seat on a basis of the attitude of the seat at the time of the manual driving state as a reference attitude, upon making a transition in driving state of the vehicle from the manual driving state to the automatic driving state.

3. The vehicle seat control apparatus according to claim 2, wherein the seat includes a seat back and the seat cushion, wherein the controller causes the seat adjuster to incline the seat cushion from the reference attitude such that an inclination angle of the seat cushion to a horizontal direction increases and incline the seat back such that an inclination angle of the seat back to the horizontal direction decreases, upon making the transition from the manual driving state to the automatic driving state, and wherein the controller causes the seat adjuster to incline the seat cushion to return to the reference attitude and incline the seat back to return to the reference attitude, upon making a transition from the automatic driving state to the manual driving state.

4. The vehicle seat control apparatus according to claim 1, wherein the controller drives the seat adjuster and returns the position of the seat to the reference position upon making a transition in the driving state of the vehicle from the automatic driving state to the manual driving state.

5. The vehicle seat control apparatus according to claim 2, wherein the controller drives the seat adjuster and returns the position of the seat to the reference position upon making a transition in the driving state of the vehicle from the automatic driving state to the manual driving state.

6. The vehicle seat control apparatus according to claim 3, wherein the controller drives the seat adjuster and returns the position of the seat to the reference position upon making a transition in the driving state of the vehicle from the automatic driving state to the manual driving state.

7. The vehicle seat control apparatus according to claim 1, wherein the storage stores, as the seat position information in the manual driving status, information that indicates the position of the seat and an attitude of the seat, upon the seat position information, the seat adjuster moves the seat rearward on the basis of the position of the seat at the time of the manual driving state as the reference position in the transition in the driving state of the vehicle from the manual driving state to the automatic driving state.

8. The vehicle seat control apparatus according to claim 7, wherein the position of the seat and the attitude of the seat include a position in a front-rear direction of the seat, an angle of a seat back, a position in an up-down direction of the seat cushion, an inclination angle of the seat cushion, a position in an up-down direction of a headrest, and an angle of the headrest.

9. The vehicle seat control apparatus according to claim 1, wherein, during the transition in the driving state of the vehicle from the manual driving state to the automatic driving state, the seat adjuster moves the seat rearward to increase a distance from a center of the seat cushion of the seat to a steering wheel of the vehicle.

10. The vehicle seat control apparatus according to claim 9, wherein, during the transition in the driving state of the vehicle from the manual driving state to the automatic driving state, the seat adjuster moves the seat to increase a distance from the seat cushion to a floor of the vehicle.

11. The vehicle seat control apparatus according to claim 4, wherein, the controller is further configured to, on a priority basis, perform one of an operation of causing to move the seat forward and an operation of causing to raise the seat backward, when the controller returns the position of the seat to the reference position.

12. The vehicle seat control apparatus according to claim 1, further comprising:

a link mechanism provided at a lower part of the seat cushion of the seat to lift the seat cushion in the automatic driving state.

13. The vehicle seat control apparatus according to claim 12, wherein, upon the transition in the driving state of the vehicle from the manual driving state to the automatic driving state, the link mechanism lifts a rear part of the seat cushion with respect to a forward part of the seat cushion as a point of support.

* * * * *